A. WYLES, Jr.
SELF CONTAINED MOTOR DRIVEN AGRICULTURAL IMPLEMENT.
APPLICATION FILED MAR. 8, 1912. RENEWED APR. 6, 1916.
1,204,223. Patented Nov. 7, 1916.
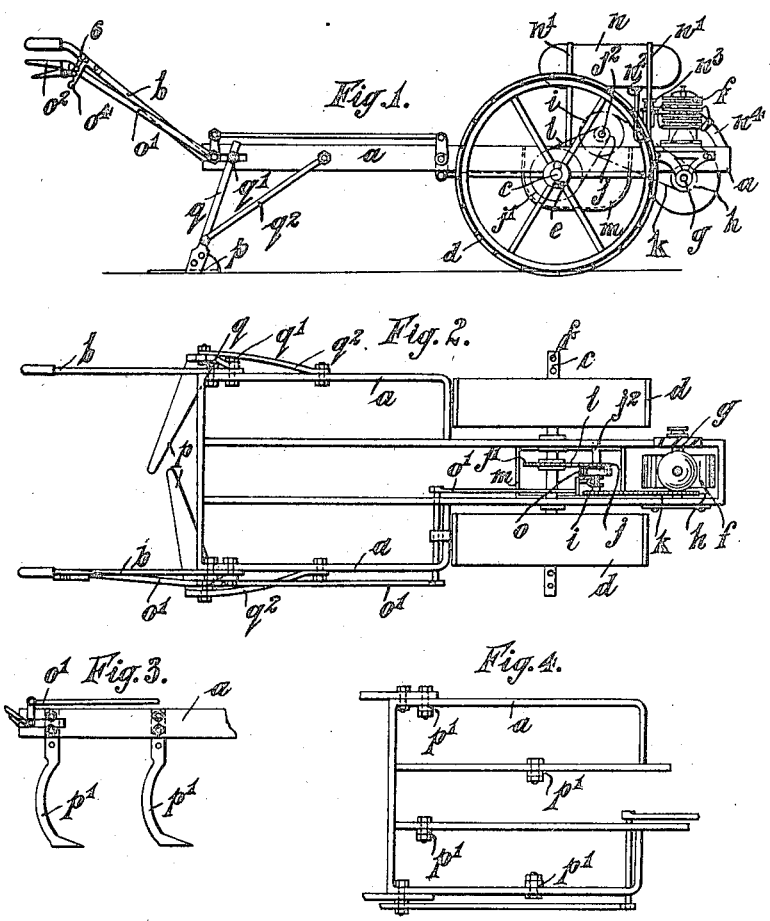

UNITED STATES PATENT OFFICE.

ALBERT WYLES, JR., OF EVESHAM, ENGLAND.

SELF-CONTAINED MOTOR-DRIVEN AGRICULTURAL IMPLEMENT.

1,204,223.  Specification of Letters Patent.  Patented Nov. 7, 1916.

Application filed March 8, 1912, Serial No. 682,481. Renewed April 6, 1916. Serial No. 89,473.

Be it known that I, ALBERT WYLES, Jr., a subject of the King of England, residing at Evesham, Worcester, in England, have invented certain new and useful Improvements in Self-Contained Motor-Driven Agricultural Implements, of which the following is a specification.

This invention relates to improvements in self contained motor driven agricultural cultivators, plows, harrows and the like, comprising an implement carrying frame terminating in the rear in a pair of controlling handles and mounted on running wheels, a motor being supported by said frame adapted to drive said wheels.

The invention primarily consists in a construction whereby the motor and appurtenant parts are so disposed as to substantially balance the frame and implements supported thereby, whereby the machine may be moved upon a single pair of wheels without the use of a trailing or caster wheel, thus considerably facilitating steering and general manipulation of the machine particularly in narrow or devious ways.

The invention further consists in rigidly but detachably securing behind the wheels and in front of the handles either cultivator tines, a plow share, seed drill, comb harrow, skim blades or the like. The running wheels may also be adjustable in width upon the axle toward and away from each other.

Practical embodiments of the invention are represented in the accompanying drawings, in which—

Figure 1 is a side elevation of a complete implement showing skim feet applied thereto. Fig. 2 is a plan view of Fig. 1. Fig. 3 is a partial side elevation showing scuffle feet mounted on the frame, and Fig. 4 is a plan of Fig. 3.

In said drawings $a$ designates the frame widened at the rear where it is provided with two handles $b$. At its forward end said frame is shown as reduced in width and carrying the axle $c$ on which are mounted the running wheels $d$ in such a manner that they may be adjusted axially of said axle toward and away from each other, being secured thereon as by split pins $e$ entering holes $f$ in the axle.

In front of the running wheels and adjacent thereto there is mounted on the frame $a$ an internal combustion engine $f$ shown as one of the air cooled type, but it may be of the water cooled class if desired, from the shaft $g$ of which motion is transferred to the running wheels $d$ by any convenient means, those shown in the drawing comprising sprocket wheels $h$, $i$, $j$, $j^1$ and coacting chains $k$, $l$. A casing $m$ may be provided to inclose part of the gearing as shown.

$n$ designates a tank supported by standards $n^1$ on the frame $a$ and from which liquid fuel as petrol is fed to the engine through a pipe $n^2$ and carbureter $n^3$; $n^4$ designates the exhaust pipe from the engine. A clutch $o$ is inserted in shaft $j^2$ carrying the sprocket wheels $i$, $j$, which clutch may be operated from one of the handles $b$ as by means of rod and lever system $o^1$ and hand lever $o^2$ having the usual catch-dog $o^3$ coacting with rack quadrant $o^4$.

To turn now to the tilling implements, these may comprise the various implements hereinbefore mentioned or any others which may be desirable or suitable for the particular purpose for which the device is to be used.

In Figs. 1 and 2, $p$, $p$, show a pair of skim feet and in Figs. 3 and 4, $p^1$ shows scuffle feet. In Fig. 1 the skim feet are secured to the frame $a$ by means of rods $q$ and bolts $q^1$ one at each side, suitable struts or stays $q^2$ being provided to produce the necessary rigidity.

In Figs. 3 and 4 the scuffle feet $p^1$ are shown as adjustably mounted on the side members of the frame $a$ and also on other intermediate longitudinal members $t$.

The weight and location of the engine and appurtenant parts are so calculated that the weight of the implements is substantially balanced when the device is at rest, the reactionary force of the engine when at work being sufficient or nearly so to cause the proper action of the tilling implements on the ground when the device is in movement, this action being obviously assisted by the operator as occasion may require.

When using the device on very soft ground it may be of advantage to regulate the depth of the skim or scuffle feet and any appropriate means may be used for this purpose.

What I claim as my invention and desire to secure by Letters Patent of the United States is:—

1. A self-contained motor driven agricultural implement comprising a frame, a pair of side by side wheels supporting said frame, a tool carried by said frame in rear of the wheels, and a motor carried by said frame in front of the wheels, said motor and tool being so disposed as to substantially balance the frame in a longitudinal direction on the wheels, substantially as described.

2. A self-contained motor driven agricultural implement comprising a frame having steering handles at its rear operable by a person walking on the ground; a pair of wheels mounted side by side supporting said frame, a tool carried by said frame in rear of the wheels, and a motor carried by said frame in front of the wheels, said motor and tool being so disposed as to substantially counterbalance each other and equipoise the frame upon the wheels in a longitudinal direction, substantially as described.

3. A self-contained motor driven agricultural implement comprising an axle, a pair of wheels mounted on said axle, a frame mounted on the axle, a tool carried by said frame in rear of the axle, and a motor carried by said frame in front of the axle, said motor and tool being substantially counterbalanced and balancing the frame upon the wheeled axle.

4. A self-contained motor driven agricultural implement comprising an axle, a pair of wheels supporting said axle, a frame mounted on the axle and having a handle on its rear end operable by a person walking on the ground to guide the implement, a tool carried by said frame in rear of the axle, and a motor carried by said frame in front of the axle, said motor and tool being so disposed as to substantially counterbalance each other and balance the frame longitudinally on the wheels, substantially as described.

5. A self-contained motor driven agricultural implement comprising a frame having steering handles at its rear operable by a person walking on the ground, an axle supporting said frame, a pair of wheels mounted side by side on said axle, a plurality of tools carried by said frame in rear of the wheels, and a motor carried by said frame in front of the wheels, said motor and tools being so disposed as to substantially counterbalance each other and also equipoise the frame longitudinally upon the axle, substantially as described.

In witness whereof I have signed this specification in the presence of two witnesses.

ALBERT WYLES, Jr.

Witnesses:
A. E. HATHAWAY,
A. J. HADDAN.